US 8,321,247 B2

(12) United States Patent
Trumbly et al.

(10) Patent No.: US 8,321,247 B2
(45) Date of Patent: Nov. 27, 2012

(54) BUSINESS LEVEL METRIC FOR INFORMATION TECHNOLOGY

(75) Inventors: James E. Trumbly, Colorado Springs, CO (US); Reinier J. Aerdts, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2381 days.

(21) Appl. No.: 10/426,071

(22) Filed: Apr. 29, 2003

(65) Prior Publication Data
US 2005/0086091 A1    Apr. 21, 2005

(51) Int. Cl.
*G06Q 10/00* (2012.01)
(52) U.S. Cl. ........................................ 705/7.11
(58) Field of Classification Search .................. 705/7, 8, 705/10, 7.11
See application file for complete search history.

(56) References Cited

U.S. PATENT DOCUMENTS

| | | | | |
|---|---|---|---|---|
| 2003/0167180 A1* | 9/2003 | Chung et al. | ...................... | 705/1 |
| 2004/0034552 A1* | 2/2004 | Cole et al. | .......................... | 705/7 |
| 2004/0068431 A1* | 4/2004 | Smith et al. | ...................... | 705/10 |

OTHER PUBLICATIONS

Budd, Mark and Christine Malcolm. "An effective metrics program can ensure IT performance success." Healthcare Financial Management. Westchester: Nov. 2001. vol. 55, Iss 11; p. 84.*
Burkett, M Alison. "Clarifying roles and responsibilities." CMA. Hamilton: Mar. 1995. vol. 69, Iss 2; p. 26.*
Budd, Mark and Christine Malcolm. "An effective metrics program can ensure IT performance success." Healthcare Financial Management. Westchester: Nov. 2001. vol. 55, Iss 11, p. 84.*
Burkett, M Alison. "Clarifying roles and responsibilities." CMA. Hamilton: Mar. 1995. vol. 69, Iss 2, p. 26.*
Lee, Young-Jai; Harrald, John R.; "Critical Issue for Business Area Impact Analysis in Business Crisis Management: Analytical Capability". 1999. Disaster Prevention and Management. vol. 8, Issue 3.*

* cited by examiner

*Primary Examiner* — Peter Choi

(57) ABSTRACT

A method, system, and computer program product for determining a business level metric for assessing the impact of performance degradation of IT components upon the revenue stream of an entity is provided. In one embodiment, the business level metric is determined by determining business functions that comprises a revenue stream for a line of business. Weights are then assigned to each business function, wherein the weights indicate the relative importance of each business function in relation to the other business functions. For each business function, the business processes that enable the completion of a specific business function are determined and weights. For each business process, critical service points for measuring the performance of supporting information technology components for the business process are determined and weights are assigned. The critical service points are then monitored and a partial business level metric raw score is determined.

14 Claims, 10 Drawing Sheets

300
Client

BUSINESS LEVEL METRIC FOR INFORMATION TECHNOLOGY

BACKGROUND OF THE INVENTION

1. Technical Field

The present invention relates generally to the field of computer software and, more specifically, to information technology.

2. Description of Related Art

Information Technology (IT) is the broad subject concerned with all aspects of managing and processing information, especially within a large organization or company. The information managed may be any type of information, but often includes business processes such as, for example, inventory management, invoicing, and accounting. Sometimes, IT is referred to as Information Services (IS) or Management Information Services (MIS). Computers and related technology are central to information management.

Many types of entities, ranging from large and small corporations to universities, require IT services. IT often requires the integration of hundreds or thousands of networked computers and many different types of application software and databases, sometimes running in different operating environments. Each piece of the system may be responsible for a different element of a business function. For example, one suite of application programs may be responsible for inventory management while another suite of application programs is responsible for billing and accounting functions within a company. However, because inventory, billing, and accounting are not completely autonomous functions, there must be some amount of integration between the application software to, at the very least, allow or sharing of some data between application suites.

Often, because of the complexities involved in providing large scale IT services, IT services are often outsourced to or provided by an outside company with specific expertise in IT. This outsourcing of IT services may be a significant operating expense for a company and the availability or unavailability of services may also significantly impact a companies revenue streams in various areas of operation. For example, some of the IT services provided by an IT provider may impact billing within one line of business for the company while other IT services may impact inventory within a different line of business for the company. Therefore, in order to ensure greater profits, companies desire to have a measure of the impact of IT upon their business in a manner that allows them to make appropriate business decisions.

Currently, there is no known method of directly tying IT based metrics to business level revenue streams. Therefore, it would be desirable to have a method, system, and computer program product to define, implement, and report on Business Level Metrics, including critical service points, established to ensure service delivery as it relates to a companies revenue stream.

SUMMARY OF THE INVENTION

The present invention provides a method, system, and computer program product for determining a business level metric for assessing the impact of performance degradation of information technology components upon the revenue stream of an entity. In one embodiment, the business level metric is determined by first determining business functions that comprises a revenue stream for a line of business. Weights are then assigned to each business function, wherein the weights indicate the relative importance of each business function in relation to the other business functions. For each business function, the business processes that enable the completion of a specific business function are determined and weights indicating the relative importance of the business processes are assigned to each business process. For each business process, critical service points for measuring the performance of supporting information technology components for the business process are determined and weights of relative importance are assigned to each of the critical service points. The critical service points are then monitored for the occurrence of specified events and, responsive to the occurrence of a specified event, a partial business level metric raw score is determined using the weights assigned to the business function, business process, and critical service points.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
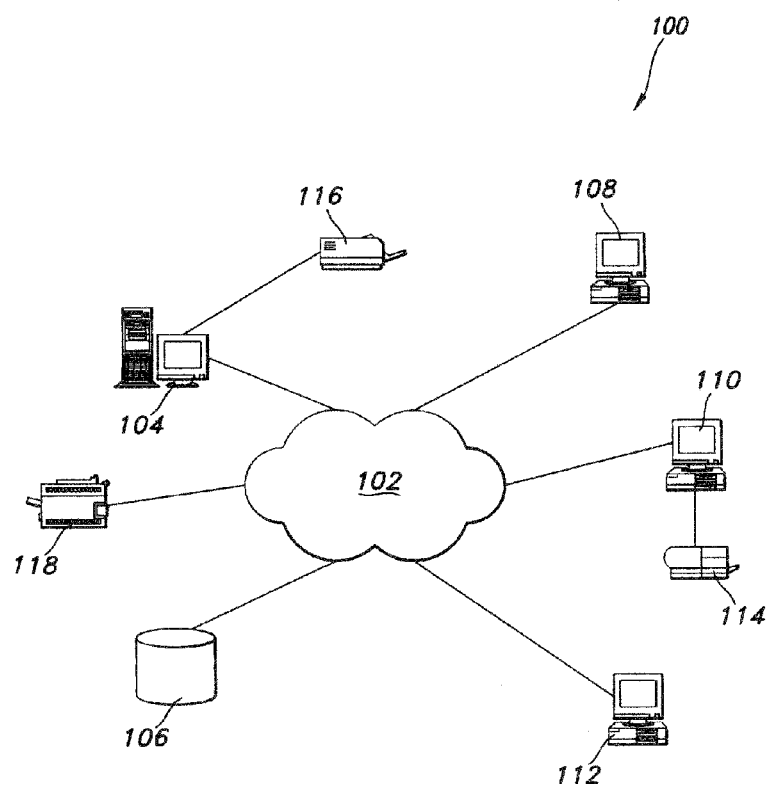
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented. Distributed data processing system 100 represents one embodiment of the hardware components of an IT service for a company or other entity.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images and applications, to clients 108-112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is an intranet, with network 102 representing a company wide collection of networks and gateways that use, for example, the TCP/IP suite of protocols or a proprietary suite of protocols to communicate with one another. Of course, distributed data processing system 100 also may be implemented as a number of different types of networks such as, for example, the Internet or a local area network.

FIG. 1 is intended as an example and not as an architectural limitation for the processes of the present invention.

Figure 2:
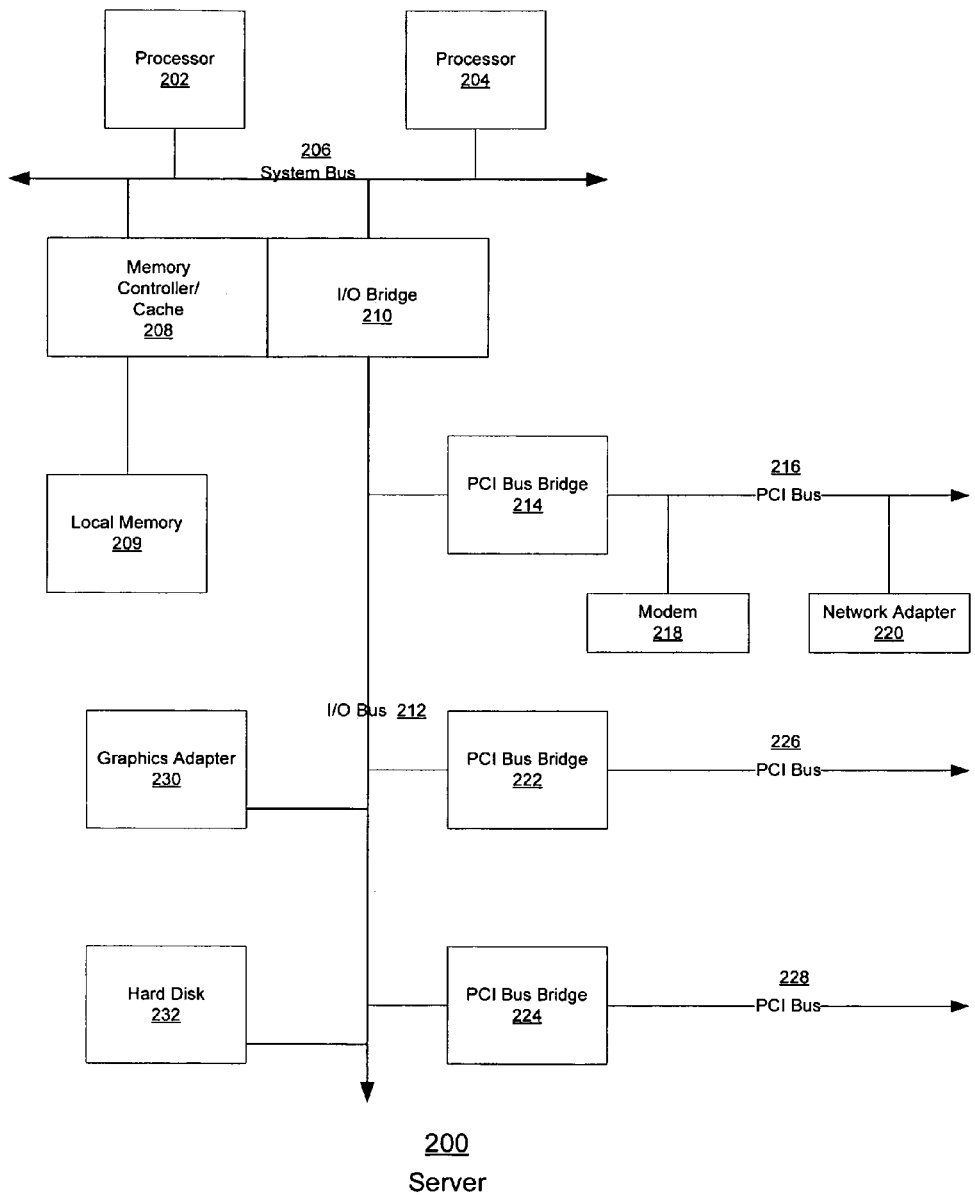
FIG. 2 depicts a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Data processing system 200 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

Figure 3:
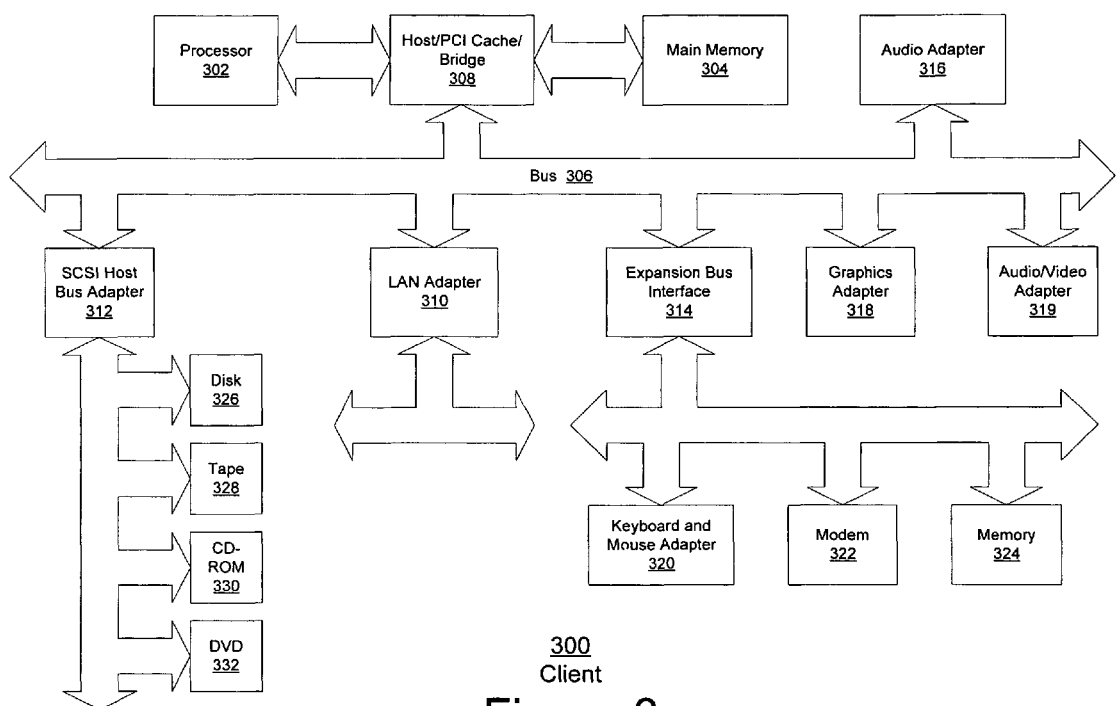
FIG. 3 depicts a block diagram of a data processing system in which the present invention may be implemented.

An operating system runs on processor 302 and is used to coordinate and provide control of various components within data processing system 300 in FIG. 3. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4A:
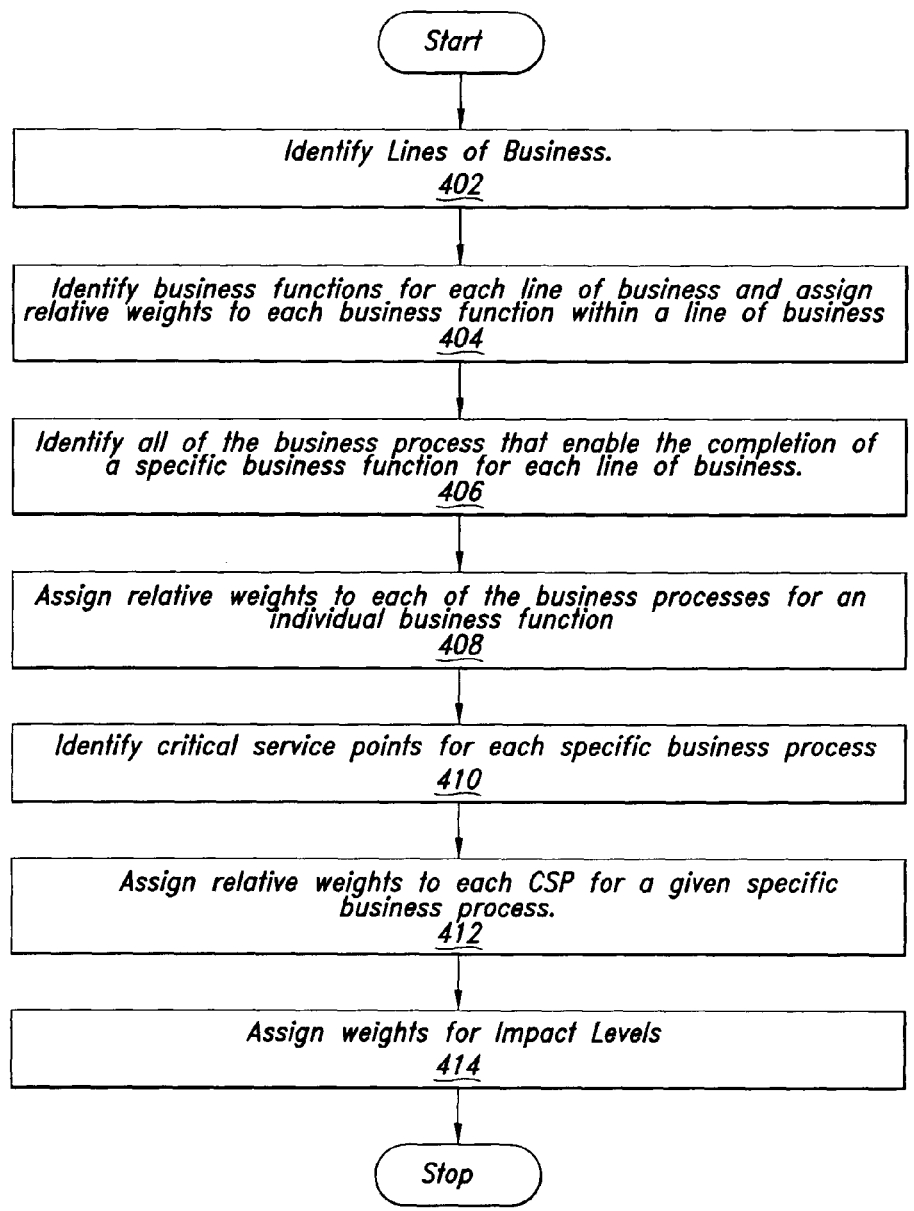
FIG. 4A depicts a diagram of an exemplary process flow and program function for establishing a weighting table according to one embodiment of the present invention.

To implement a business level metric for IT, the business functions associated with each line of business must be identified and the relative weights assigned to the various business functions and associated business processes. With reference now to FIG. 4A, a diagram of an exemplary process flow and program function for establishing a weighting table is depicted according to one embodiment of the present invention. In order to implement a business level metric to measure the cost of an entity's Information Technology (IT) several aspects of the entity's business or enterprise must be identified. Thus, the first step is to identify the various business functions for a Line of Business (LOB) (step 402). The next step is to populate a weighting table that identifies the relative importance of each of the business functions that comprise the revenue stream for a specific Line of Business (LOB). (step 404). Examples of business functions include Order entry, service provisioning, billing, collections, and traffic. The assigned weights of the various business functions must be assigned such that the total weights of all the business functions adds to one (1). This relative weighting of the various business functions of the business is typically assigned by the business.

Next, for each business function, identify all of the defined business processes that enable the completion of a specific business function. (step 406). Then take all of the defined business processes that enable the completion of that specific business function and assign weights to each of those business processes to indicate the relative importance of that individual business process to the overall business function. (step 408). Again, the weights need to total to one (1). Repeat this step 408, for each of the identified business functions.

Next, identify each of the critical service points (CSPs) for each specific business process previously identified, in order to measure the performance supporting each specific business process (step 410). Then take all of the CSPs for a given specific business process and assign relative weights to the CSPs. (step 412). Again, the weights of the CSPs for a given specific business process should total to one (1). Repeat step 412 for each specific business process for each business function. Next, assign weights for the Impact Levels. (step 414). The Impact Level is a numeric score assigned to an event that impacts a Critical Service Point. The Impact Levels are consistent for each and every Business Level Metric. Once this has been completed, a weighting table will have been populated.

Once the weighting table is populated, the weighting table is used to provide a Business Level Metric (BLM) raw score, typically on a periodic basis, such as, for example, monthly. Thus, when a CSP impacting event occurs, there is only one subjective component to determine: the assigned Impact Level. It is known which CSP was impacted, which also indicates which Business Process and the associated Business Function that were impacted. Therefore, once the impact level has been properly assigned, all of the variables are known. Thus, when a CSP impacting event occurs, all the weighting factors for the CSP, business process, and business function are multiplied together to achieve a BLM impact score. These scores are summed periodically (e.g., monthly) to achieve a BLM raw score, which may optionally be multiplied by 100 for scaling purposes. Thus, once the BLM weighting Table has been populated, the only input is the impact level (e.g., 1, 2, or 3) that is assigned to an event and the particular CSP that is impacted.

Figure 4B:
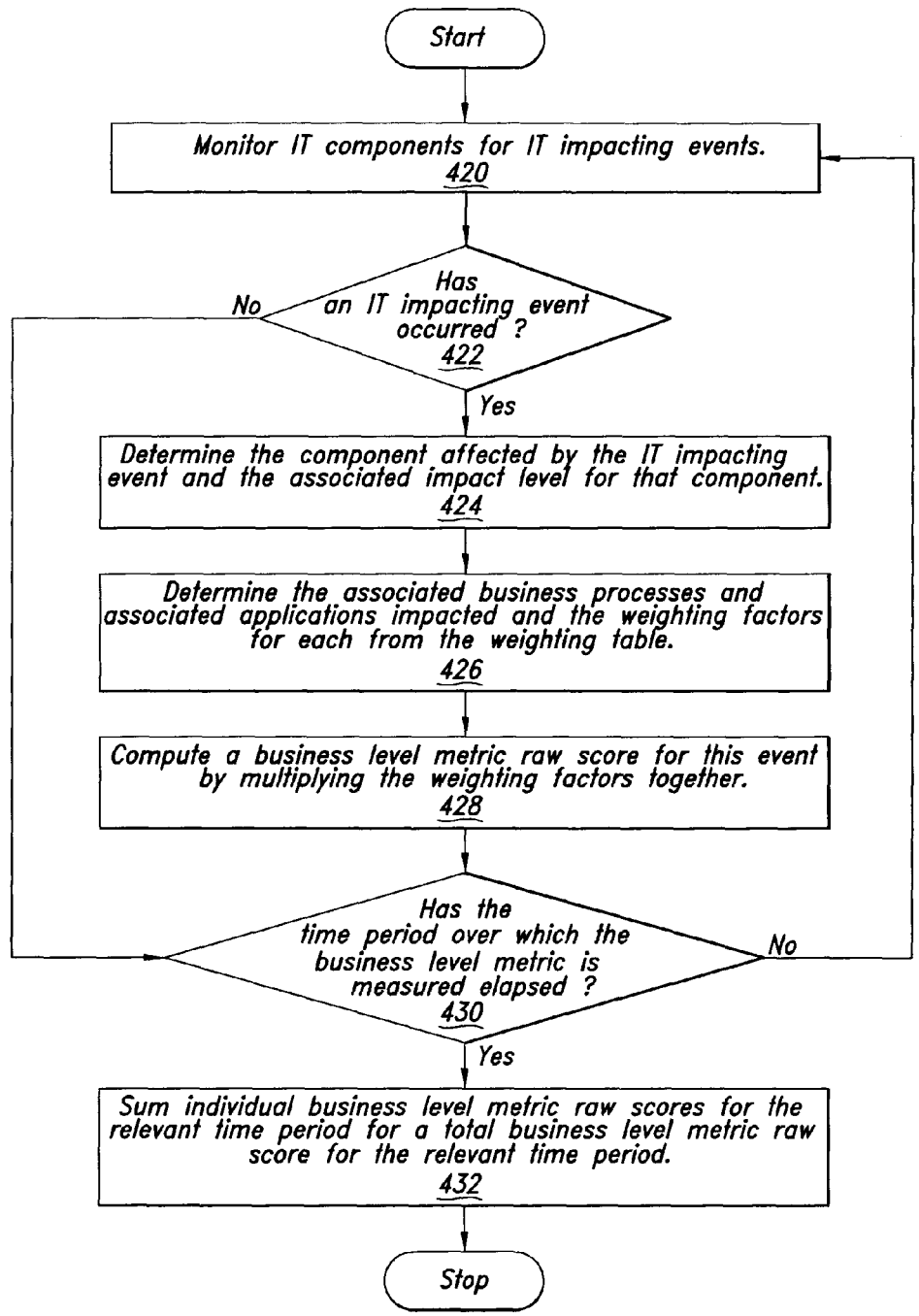
FIG. 4B depicts a diagram illustrating and exemplary process flow and program function for generating a business level metric for a specified period of time in accordance with one embodiment of the present invention.

With reference now to FIG. 4B, a diagram illustrating and exemplary process flow and program function for generating a business level metric for a specified period of time is depicted in accordance with one embodiment of the present invention. To determine a business level metric for a specified time period, such as, for example, monthly, the IT components of a system are monitored for IT impacting events. (step 420). An IT impacting event may be, for example, an error when performing a routine, performance slow down, or denial of service. Each different type of impacting event may be assigned a different value depending on how an enterprise perceives the associated cost with an impacting event. For example, a denial of service will probably be considered a more severe problem than performance slow down. Thus, a denial of service event will be assigned a heavier value (e.g. impact weight 3) than a performance slow down event (e.g. impact weight 2). The system determines whether an IT impacting event has occurred. (step 422). If no IT impacting event has occurred, then the system determines whether the time period over which the business level metric is computed (e.g., monthly) has expired. (step 430). If the time period has not expired, then the system continues to monitor IT components for IT impacting events. (step 420).

If an IT impacting event has occurred (step 422), the system determines the component affected by the IT impacting event and the associated impact level for that component and event type. (step 424). The system then determines the associated business processes and associated applications impacted and the weighting factors for each process and application from the weighting table. (step 426). An event level business level metric raw score is then computed by multiplying the weighting factors for the impact level, the associated application weighting factor, the business process weighting factor (step 428). The system then determines whether the time period over which the business level metric is measured has elapsed (step 430) and, if not, continues to monitor the IT components of for IT impacting events (step 420). If the time period over which the business level metric is measured has elapsed, then the individual business level metric raw scores for the relevant time period are summed to achieve a total business level metric raw score for the relevant time period (step 432).

Once the total business level metric raw score has been determined, it can be used as a raw score or scaled (e.g., multiplied by 100). The business level metric score (raw or scaled) can be compared to a nominal value set to determine, for example, whether the enterprise receives a discount from an IT provider due to failure to deliver services according to contractually agreed to terms.

It should be noted that in the procedures to compute the business level metric can be adjusted such that some events do not impact the business level metric. For example, if the business level metric is used to determine whether the IT provider is performing at an agreed upon level, then applications and hardware that are not provided by the IT provider can be excluded from the calculation of the business level metric such that the IT provider is not penalized due to factors beyond the control of the IT provider.

It should also be noted that the process flows depicted in FIGS. 4A and 4B are provided as examples and not as limitations of the present invention. Various steps could be performed in different orders from those presented. Furthermore, additional steps not enumerated could also be included.

Figure 4C:
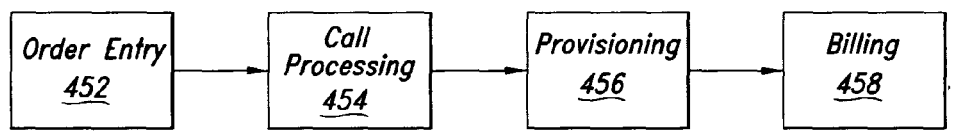
FIG. 4C depicts a diagram of a set of business functions for a line of business in order to provide an example of an implementation the present invention.

With reference now to FIG. 4C, a diagram of a set of business functions for a line of business is depicted in order to provide an example of an implementation the present invention. A exemplary line of business for an enterprise may include Order Entry 452, Call Processing 454, Provisioning 456, and Billing 458. Each one of these business functions 452, 454, 456, and 458 can have a business level metric computed to aid the enterprise in determining the costs associated with the IT portion of the enterprises assets that are needed in order for these business functions 452, 454, 456, and 458 top be performed. Therefore, each business function is analyzed to determine business processes, associated software applications, measurement points, and possibly a responsibility matrix when different components of the IT and computer resources are provided by different providers.

Figure 5:
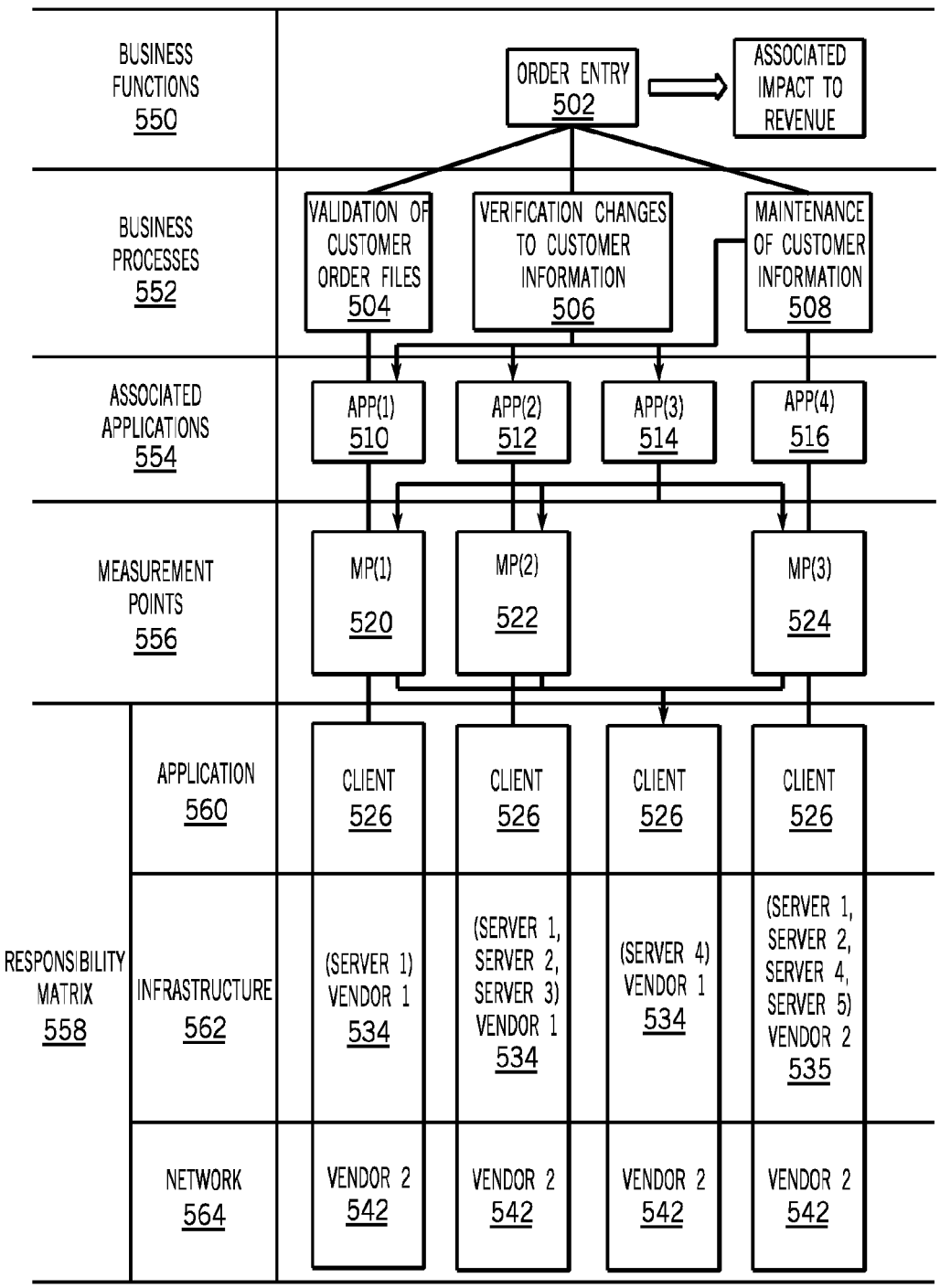
FIGS. 5-8 depict diagrams of the various components of IT and computing resources that are associated with each business function from FIG. 4C and their relationship in computing a business level metric for a particular business function are illustrated in accordance with the present invention.

With reference now to FIGS. 5-8, diagrams of the various components of IT and computing resources that are associated with each business function from FIG. 4C and their relationship in computing a business level metric for a particular business function are illustrated. Referring first to FIG. 5, order entry 502 is the Business Function 550. The Business Processes 552 associated with Order Entry 502 are Validation of Customer Order Files 504, Verification of Changes to Customer Information 506, and Maintenance of Customer Information 508. The Associated Software Application 554 for Validation of Customer Order Files 504 is App(1) 510. The Associated Software Applications 554 for Verification of Changes to Customer Information 506 are App(1) 510, App (2) 512, and App(3) 514. The Associated Software Applications 554 for Maintenance of Customer Information 508 are App(1) 510, App(2) 512, App(3) 514, and App(4) 516.

Each Associated Software Application 554 has an associated Measurement Point 556. The Measurement Point for App(1) 510 is MP(1) 520. The Measurement Point 556 for App(2) 512 is MP(2) 522. The Measurement Points 556 for OA 514 are MP(1) 520, MP(2) 522, and MP(3) 524. The Measurement Point for App(4) 516 is MP(3) 524.

In situations where some parts of the IT system are created or maintained by different parties, a responsibility matrix 558 may be created that identifies which parties are responsible for which applications, components, and systems. Thus, a party is not penalized and held responsible for impacts to business caused by a portion of the IT system that that party has no control over. Thus, in the example depicted in FIG. 5, the client 526 (i.e., the entity which has an enterprise or business supported by the IT supplied by vendors 1 and 2) is responsible for maintenance of the applications 560. Vendor 1 534, which supplies various infrastructure components enumerated in the Figures, such as, for example, servers 1-5, is responsible for the infrastructure 562. Vendor 2 542 is responsible for the network 564. Thus, if an infrastructure component, such as, for example, Coyote, is impacted by one of several specified events, the corresponding impact on the appropriate business function or functions 550 can be calculated since it is known as to which business processes 552 and functions 550 rely upon this component and the relevant weighting factors are also known.

Figure 6:
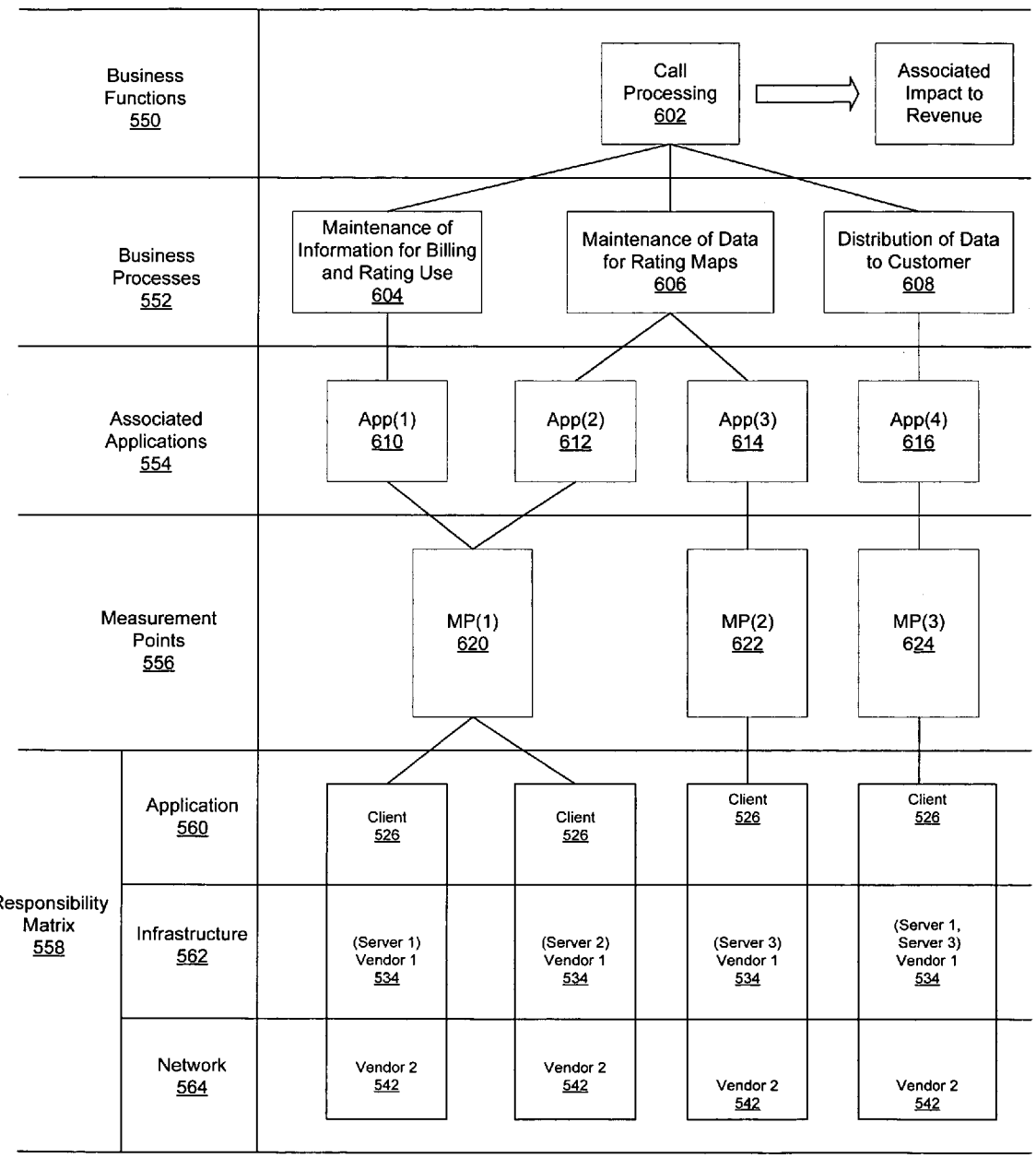

Referring now to FIG. 6, the business functions 550 is call processing 602. Call processing 602 has business processes 552 which are associated with it. These business processes are Maintenance of Information for Billing and Rating Use 604, Maintenance of Data for Rating Maps 606, and Distribution of Data to Customer 608. Each of these business processes 552 has associated applications 554. The associated business applications 554 are App(1) 610, App(2) 612, App(3) 614, and App(4) 616 which are associated with various business processes 552 as depicted. Each one of these has measurement points 620-624 associated as depicted and each measurement point 620-624 has various applications 560 infrastructure 562, and network components 564 on which it is depicted as illustrated in FIG. 6.

Figure 7:
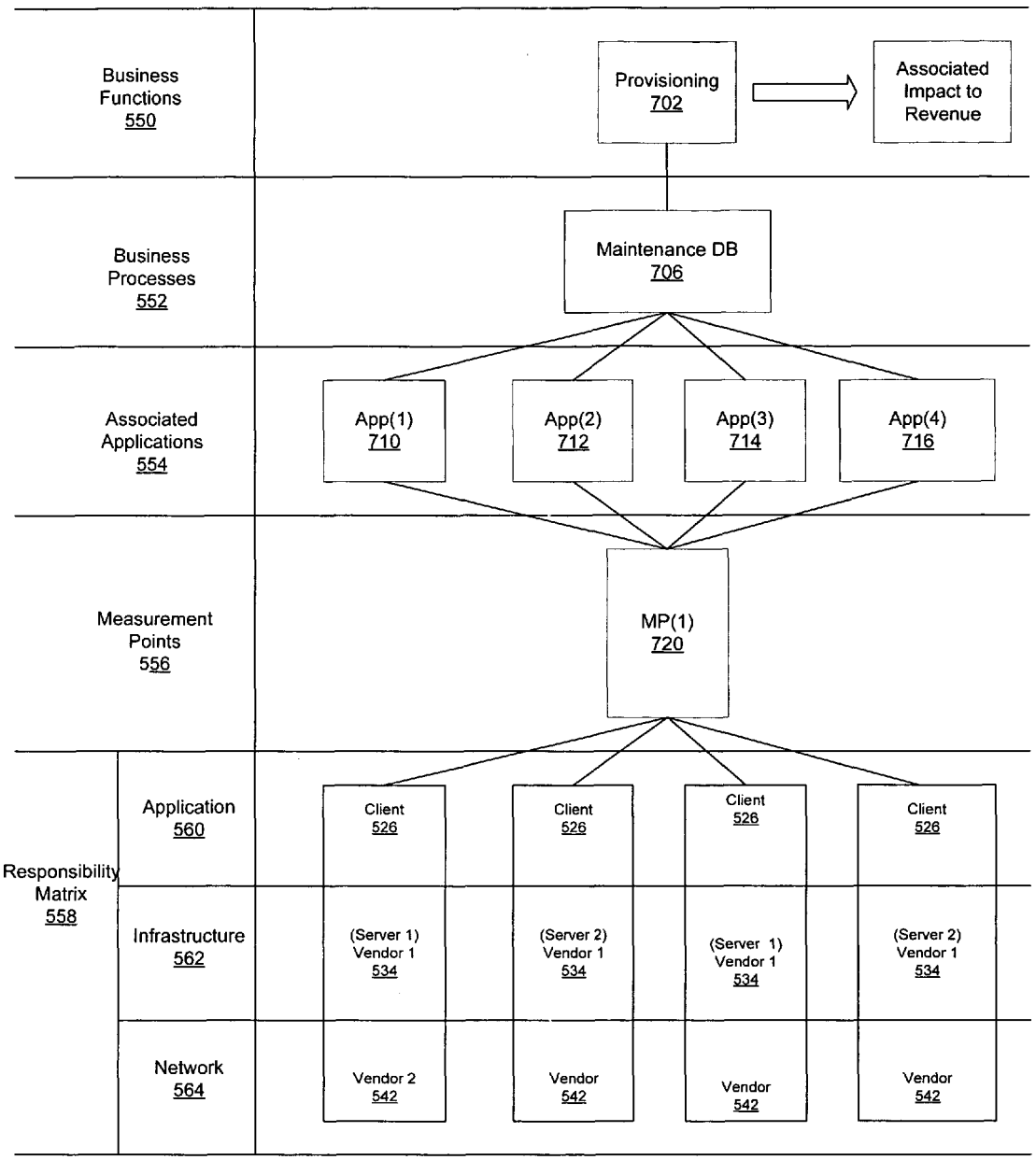

Similarly, FIG. 7 illustrates the various levels of processes, applications, measurement points, and responsibility matrices used in determining a business level metric for the provisioning business function for a line of business. The business process 552 for provisioning 702 is the Maintenance of Database 706. The associated applications 554 for this business process are app(1) 710, app(2) 712, app(3) 714, and app(4) 716. This particular business function 550 has but a single measurement point 556 which is MP 1 720. The responsibility matrix 558 is broken up similarly to the responsibility matrix 558 for the other business functions.

Figure 8:
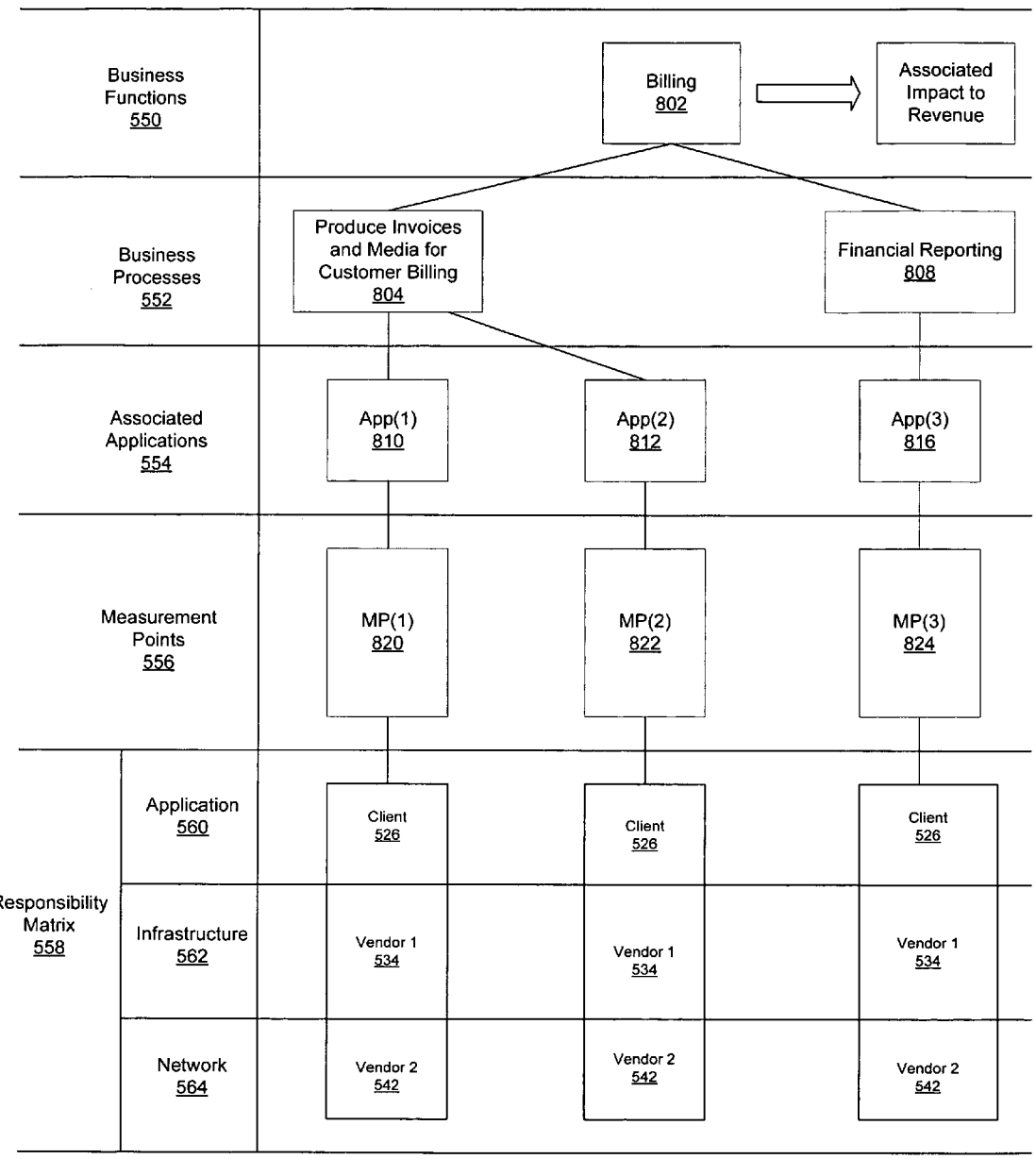

FIG. 8 illustrates the various levels of processes, applications, measurement points, and responsibility matrices used in determining a business level metric for the billing business function for a line of business. The business processes 552 for the billing 802 business function 550 are Produce Invoices and Media for customer Billing 804 and Financial Reporting 808. The Associated Applications 554 for the Produce Invoices and Media for Customer Billing 804 business process 552 are app(1) 810 and app(2) 812. The Associated Application 554 for the Financial Reporting 808 Business Process 552 is app(3) 816. Each of the Associated Applications 554 in this example has a single measurement point 820-824. Each measurement point is assigned a responsibility matrix 558 similar as to that described above for the other business functions 550.

Once each business function 550 has been identified and had its business processes, associated applications, measurement points, and responsibility matrices determines, a business level metric may be computed for the business function following the procedures described previously in FIGS. 4A and 4B. Thus, a business may assign a particular threshold value below which a vendor must maintain the business level metric in order to avoid penalties. This ensures that the businesses profitability is not adversely affected by poor performance of an IT vendor and conversely allows a vendor to demonstrate that their services are beneficial to the business.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product in a computer readable media for use in a data processing system for determining a business level metric for information technology, the computer program product comprising:

first instructions for determining business functions that comprise a revenue stream for a line of business;

second instructions for assigning weights to each business function, wherein the weights indicate the relative importance of each business function in relation to the other business functions;

third instructions for each business function, for determining business processes that enable the completion of a specific business function and assigning weights of relative importance to each of the business processes;

fourth instructions for each business process, for determining critical service points for measuring the performance of supporting information technology components for the business process and assigning weights of relative importance to each of the critical service points;

fifth instructions for monitoring the critical service points for specified events; and sixth instructions, responsive to the occurrence of a specified event, for determining a partial business level metric raw score, wherein determining a partial business level metric raw score comprises:
  determining an impact level for a measurement point impacted by the specific event,
  identifying associated business processes and associated applications that are associated with the measurement point impacted,
  determining associated weighting factors for each identified business process and identified associated application, and
  multiplying the impact level by each of the associated weights for the associated business processes and associated applications.

2. The computer program product as recited in claim 1, further comprising:
  seventh instructions for creating a responsibility matrix which identifies an entity that is responsible for an information technology component.

3. The computer program product as recited in claim 2, further comprising: eighth instructions, responsive to a determination that the specified event occurred in a component for which an information technology vendor is not responsible, for refraining from computing a partial business level metric raw score based on the specified event.

4. The computer program product as recited in claim 1, further comprising: seventh instructions for periodically summing each partial business level metric raw score to determine a business level metric score for a specified time period.

5. The computer program product as recited in claim 4, further comprising: eighth instructions for comparing the business level metric score to a predetermined threshold score to determine the impact of the information technology on the revenue stream of the business.

6. The computer program product as recited in claim 5, further comprising: ninth instructions, responsive to a determination that the business level metric meets a specified relationship to the threshold score, for assessing a penalty to the information technology vendor.

7. The computer program product as recited in claim 5, further comprising: ninth instructions, responsive to a determination that the business level metric meets a specified relationship to the threshold score, for rewarding the information technology vendor.

8. A system for determining a business level metric for information technology, the system comprising:
  first means for determining business functions that comprises a revenue stream for a line of business;
  second means for assigning weights to each business function, wherein the weights indicate the relative importance of each business function in relation to the other business functions;
  third means for each business function, for determining business processes that enable the completion of a specific business function and assign weights of relative importance to each of the business processes;
  fourth means for each business process, for determining critical service points for measuring the performance of supporting information technology components for the business process and assign weights of relative importance to each of the critical service points;
  fifth means for monitoring the critical service points for specified events; and
  sixth means, responsive to the occurrence of a specified event, for determining a partial business level metric raw score, wherein determining a partial business level metric raw score comprises:
    determining an impact level for a measurement point impacted by the specific event,
    identifying associated business processes and associated applications that are associated with the measurement point impacted,
    determining associated weighting factors for each identified business process and identified associated application, and
    multiplying the impact level by each of the associated weights for the associated business processes and associated applications.

9. The system as recited in claim 8, further comprising:
  seventh means for creating a responsibility matrix which identifies an entity that is responsible for an information technology component.

10. The system as recited in claim 9, further comprising: eighth means, responsive to a determination that the specified event occurred in a component for which an information technology vendor is not responsible, for refraining from computing a partial business level metric raw score based on the specified event.

11. The system as recited in claim 8, further comprising: seventh means for periodically summing each partial business level metric raw score to determine a business level metric score for a specified time period.

12. The system as recited in claim 11, further comprising: eighth means for comparing the business level metric score to a predetermined threshold score to determine the impact of the information technology on the revenue stream of the business.

13. The system as recited in claim 12, further comprising: ninth means, responsive to a determination that the business level metric meets a specified relationship to the threshold score, for assessing a penalty to the information technology vendor.

14. The system as recited in claim 12, further comprising: ninth means, responsive to a determination that the business level metric meets a specified relationship to the threshold score, for rewarding the information technology vendor.

* * * * *

UNITED STATES PATENT AND TRADEMARK OFFICE
CERTIFICATE OF CORRECTION

PATENT NO. : 8,321,247 B2
APPLICATION NO. : 10/426071
DATED : November 27, 2012
INVENTOR(S) : James E. Trumbly et al.

It is certified that error appears in the above-identified patent and that said Letters Patent is hereby corrected as shown below:

On the Title page, in field (57), Abstract, in column 2, line 12, delete "weights." and insert
-- weights are assigned. --, therefor.

Signed and Sealed this
Nineteenth Day of March, 2013

Teresa Stanek Rea
*Acting Director of the United States Patent and Trademark Office*